US 8,041,738 B2

(12) United States Patent
Flaks et al.

(10) Patent No.: US 8,041,738 B2
(45) Date of Patent: *Oct. 18, 2011

(54) STRONGLY TYPED TAGS

(75) Inventors: Jason S. Flaks, Redmond, WA (US);
John M. Thornton, Kirkland, WA (US);
Ryan Kabir, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/024,889

(22) Filed: Feb. 10, 2011

(65) Prior Publication Data
US 2011/0131254 A1 Jun. 2, 2011

Related U.S. Application Data

(63) Continuation of application No. 11/821,711, filed on Jun. 25, 2007, now Pat. No. 7,912,860.

(51) Int. Cl.
*G06F 7/00* (2006.01)
*G06F 17/30* (2006.01)

(52) U.S. Cl. ........ 707/790; 707/791; 707/802; 707/803; 715/700; 715/705; 715/713

(58) Field of Classification Search .................. 707/790, 707/791, 802, 803, 999.1, 999.102; 715/700, 715/705, 713
See application file for complete search history.

(56) References Cited

U.S. PATENT DOCUMENTS

| | | |
|---|---|---|
| 7,028,043 B2 * | 4/2006 | Bleizeffer et al. ............ 707/754 |
| 7,117,445 B2 | 10/2006 | Berger |
| 7,136,826 B2 | 11/2006 | Alsafadi et al. |
| 7,587,101 B1 | 9/2009 | Bourdev |
| 7,912,860 B2 | 3/2011 | Flaks |
| 7,941,462 B2 * | 5/2011 | Akinyemi et al. ............ 707/803 |
| 2002/0107829 A1 * | 8/2002 | Sigurjonsson et al. ........... 707/1 |
| 2002/0198909 A1 | 12/2002 | Huynh et al. |
| 2003/0033296 A1 | 2/2003 | Rothmuller et al. |
| 2003/0037033 A1 * | 2/2003 | Nyman et al. .................... 707/1 |
| 2004/0143610 A1 * | 7/2004 | Engelsmann et al. ........ 707/204 |
| 2004/0153456 A1 | 8/2004 | Charnock et al. |
| 2004/0186896 A1 | 9/2004 | Daniell et al. |
| 2005/0031106 A1 | 2/2005 | Henderson |
| 2005/0256907 A1 * | 11/2005 | Novik et al. .................. 707/200 |
| 2005/0281401 A1 * | 12/2005 | Creamer et al. ......... 379/142.06 |
| 2006/0080335 A1 | 4/2006 | Freeborg et al. |
| 2007/0011186 A1 | 1/2007 | Horner et al. |
| 2007/0022110 A1 | 1/2007 | Suda et al. |
| 2007/0023507 A1 | 2/2007 | Starbuck et al. |

(Continued)

OTHER PUBLICATIONS

"Associating Pictures of people with their Contacts listings", Retrieved from <<http://kb.palm.com/SRVS/CGI-BIN/WEBCGI.EXE?New, Kb=PalmSupportKB,ts=Palm_External2001, Case=obj(31174)>>on Apr. 9, 2007, (Apr. 5, 2004), 3 pages.

(Continued)

*Primary Examiner* — Hares Jami

(57) ABSTRACT

In one or more embodiments, a tag is provided and includes a property that associates a strongly typed variable with the tag. Strongly typed variables can include any suitable types. For example, in at least some embodiments, the strongly typed variable is a people type that allows the tag to be associated with an individual person or group of people by virtue of a unique identification that is associated with the person or group. Strongly typed tags can then serve as a foundation upon which various other types of information and services can be provided to enhance the user experience.

17 Claims, 6 Drawing Sheets

U.S. PATENT DOCUMENTS

| | | | |
|---|---|---|---|
| 2007/0067392 | A1 | 3/2007 | Torres et al. |
| 2007/0098303 | A1 | 5/2007 | Gallagher et al. |
| 2007/0250496 | A1 | 10/2007 | Halliday et al. |
| 2007/0295797 | A1 | 12/2007 | Herman et al. |
| 2008/0016098 | A1* | 1/2008 | Frieden et al. ............... 707/102 |
| 2008/0091723 | A1* | 4/2008 | Zuckerberg et al. ....... 707/104.1 |
| 2008/0320027 | A1 | 12/2008 | Flaks |
| 2009/0328033 | A1 | 12/2009 | Kohavi et al. |

OTHER PUBLICATIONS

"Best Full Screen Caller—User Guide", Retrived from <<http://mobile.lockergnome.com/product.asp?id=8498>>on Apr. 9, 2007, 6 pages.

"Final Office Action", U.S. Appl. No. 11/821,711, (Jan. 7, 2010),13 pages.

"Final Office Action", U.S. Appl. No. 11/821,711, (Jul. 28, 2010),15 pages.

"Non-Final Office Action", U.S. Appl. No. 11/821,711, (Sep. 17, 2009),11 pages.

"Non-Final Office Action", U.S. Appl. No. 11/821,711, (Feb. 25, 2010),14 pages.

"Non-Final Office Action", U.S. Appl. No. 11/821,711, (Sep. 28, 2010),18 pages.

"Notice of Allowance", U.S. Appl. No. 11/821,711, (Jan. 25, 2011),11 pages.

"Photo Contacts Pro", Retrieved from <<http://www.pocketx.net/products/photocontactspro_ppc/>>on Apr. 9, 2007, (2001), 17 pages.

"Sony Ericsson P800 Review—Phone/ Contacts/Calendar", Retrieved from <<http://www.mobiledia.com/reviews/sonyericsson/p800/page5.html>>on Apr. 9, 2007, (2002),4 pages.

Golder, Scott A., "The Structure of Collaborative Tagging Systems", *In Proceedings of CoRR* 2005, 8 pages.

* cited by examiner

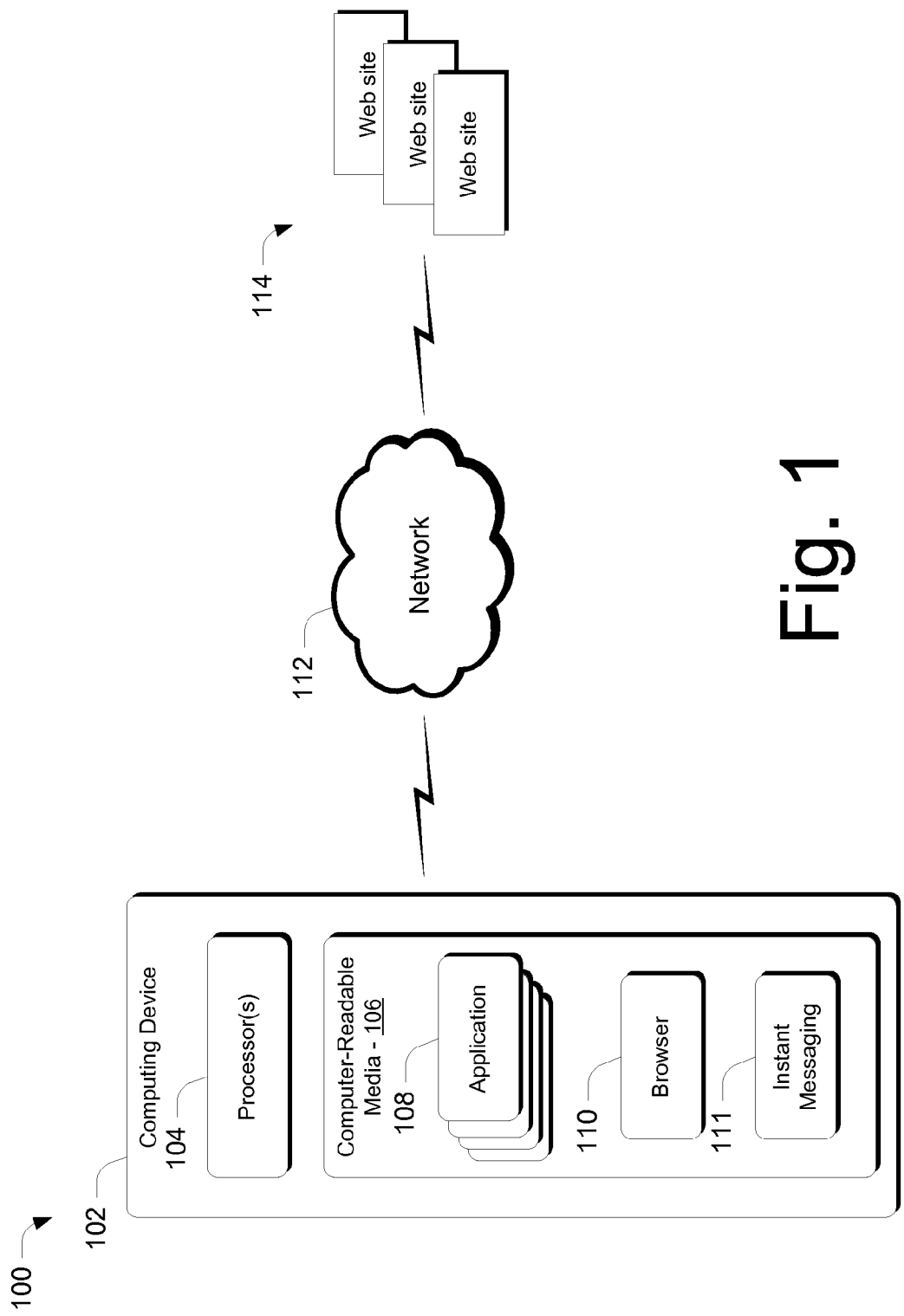

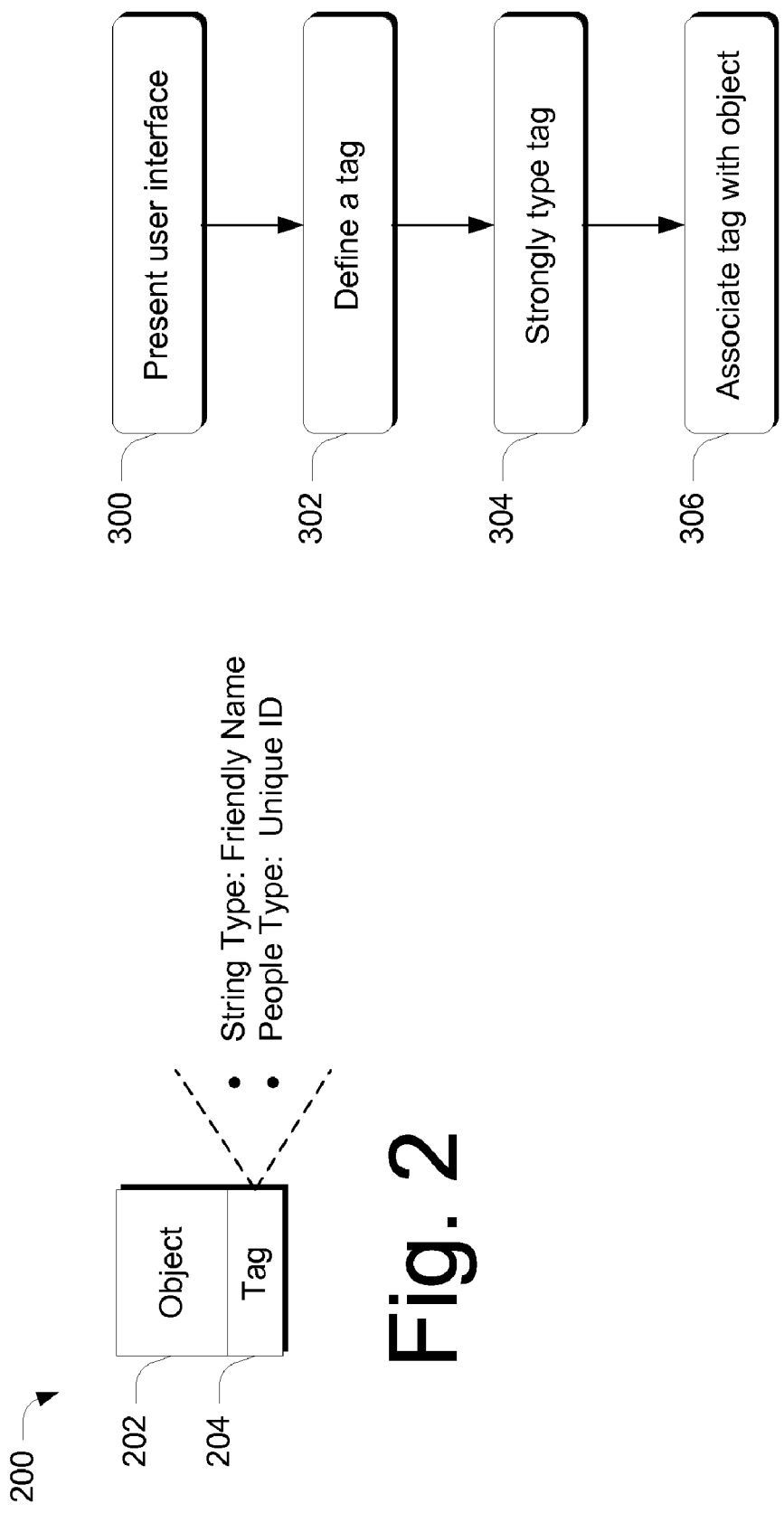

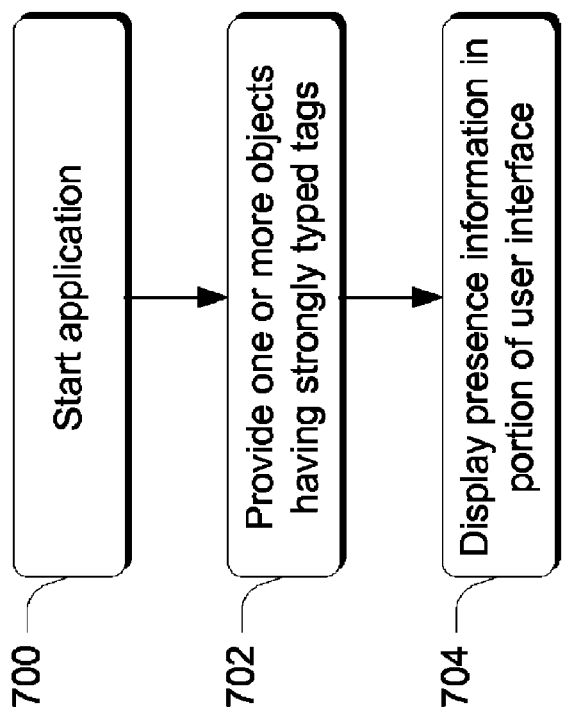
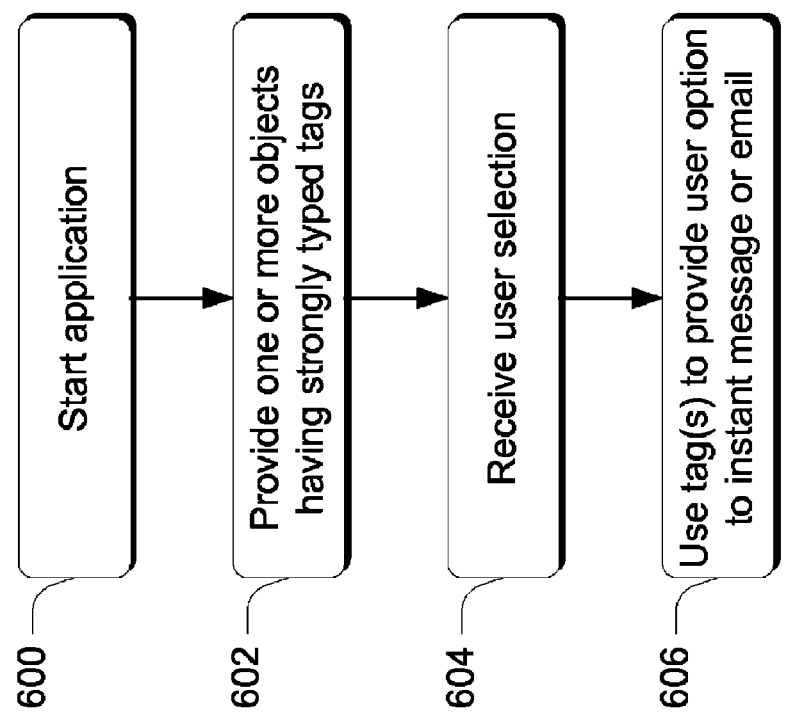

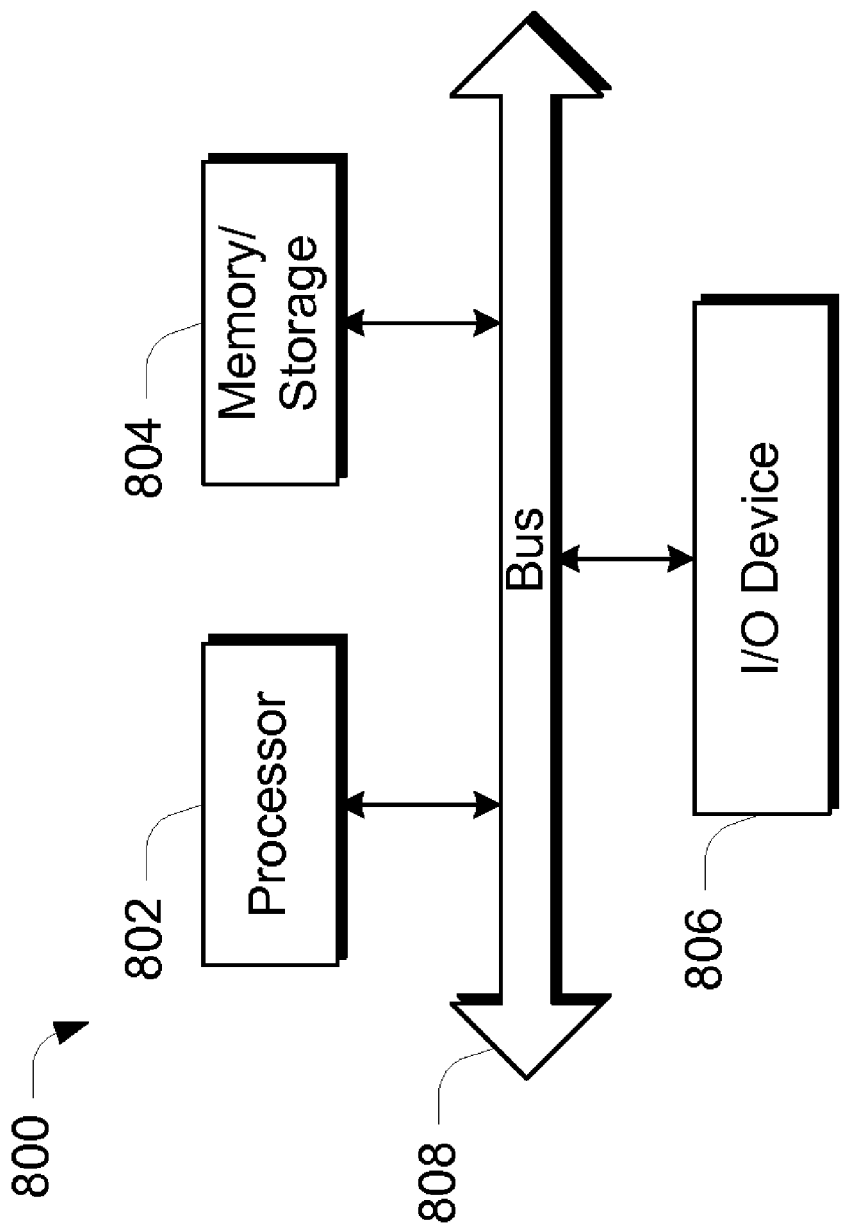

US 8,041,738 B2

STRONGLY TYPED TAGS

PRIORITY

This application is a continuation of and claims priority to U.S. patent application Ser. No. 11/821,711 filed Jun. 25, 2007, the disclosure of which is incorporated by reference as if set forth in its entirety for all purposes.

BACKGROUND

Tagging, also referred to as "social bookmarking" provides a way for users to help categorize items such as photos, videos, blogs, and other digital items. Tagging provides a way to assign categories to an item and can be used to help categorize an item on a computing device.

Generally, when a user tags an item, they assign a text string to the object. For example, a user may tag a particular photo with a text string "Dad" to indicate that the photo contains a picture of their father. The tag then resides in the form of metadata that is associated with that photo. Yet, tags tend to be somewhat generic text strings that make it difficult if not impossible to use the data of the tag in any other way. That is, typically, tags have a meaning to the user who assigned the tag, or perhaps to a couple of people associated with the user. But, after that, a tag's meaning and utility can become questionable.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one or more embodiments, a tag includes a property that allows an association with a strongly typed variable. Strongly typed variables can include any suitable types. For example, in at least some embodiments, the strongly typed variable is a people type that allows the tag to be associated with an individual person or group of people by virtue of a unique identification (ID) that is associated with the person or group. Strongly typed tags can then serve as a foundation upon which various other types of information and services can be provided to enhance a user's experience.

BRIEF DESCRIPTION OF THE DRAWINGS

The same numbers are used throughout the drawings to reference like features.

FIG. 1 illustrates an operating environment in which various principles described herein can be employed in accordance with one or more embodiments.

FIG. 2 illustrates an object and a strongly typed tag in accordance with one or more embodiments.

FIG. 3 is a flow diagram that describes steps in a method in accordance with one or more embodiments.

FIG. 6 is a flow diagram that describes steps in a method in accordance with one or more embodiments.

FIG. 7 is a flow diagram that describes steps in a method in accordance with one or more embodiments.

FIG. 8 illustrates an example system that can be used to implement one or more embodiments.

DETAILED DESCRIPTION

Overview

Figure 4:
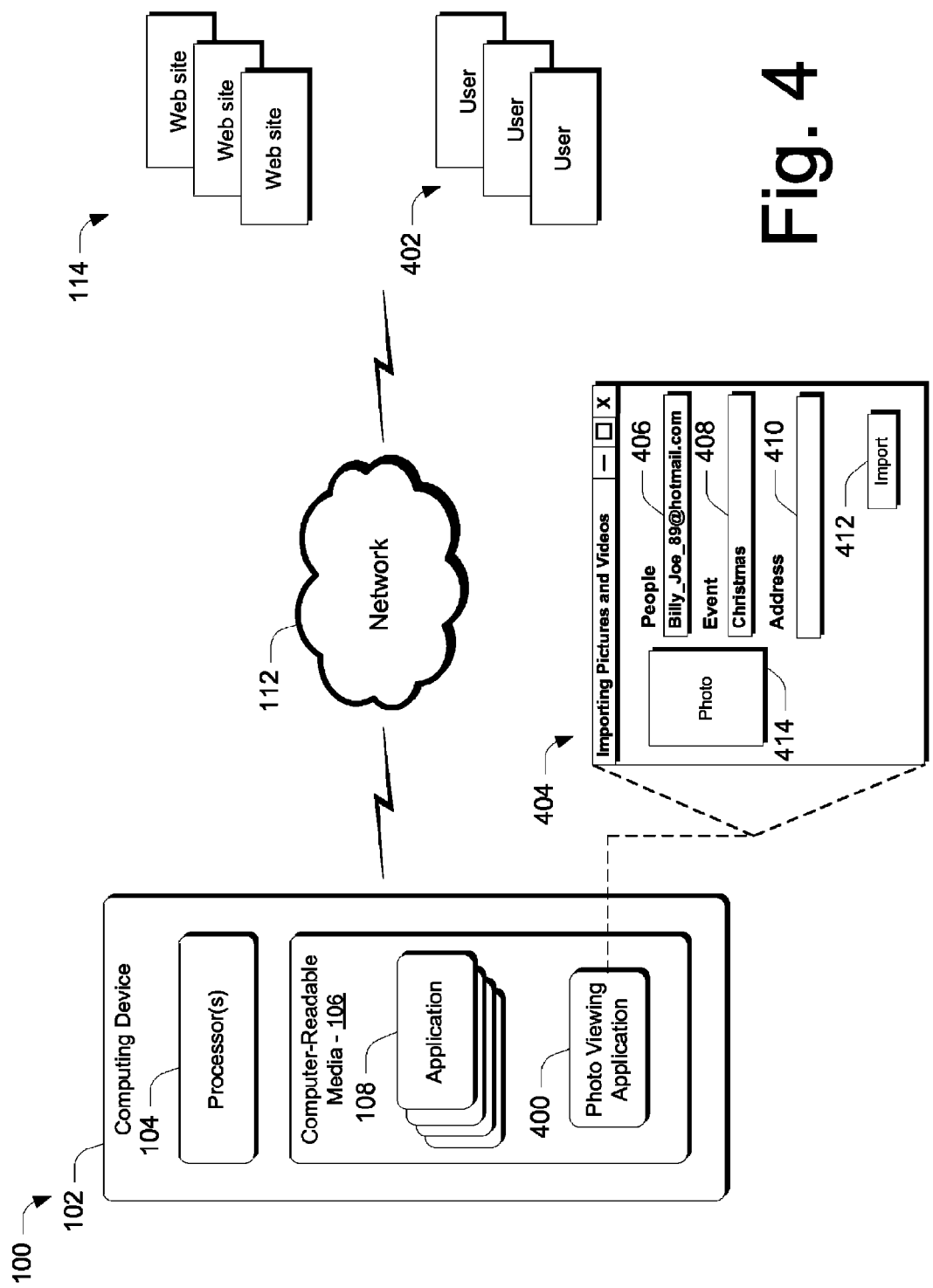
FIG. 4 illustrates an example system in accordance with one or more embodiments.

In one or more embodiments, a tag includes a property that allows an association with a strongly typed variable. A strongly typed variable is one that explicitly represents only one variable type. Strongly typed variables can include any suitable types. For example, in at least some embodiments, the strongly typed variable is a people type that allows the tag to be associated with an individual person or group of people by virtue of a unique identification (ID) that is associated with the person or group. Strongly typed tags can then serve as a foundation upon which various other types of information and services can be provided to enhance a user's experience.

In the discussion that follows, a section entitled "Operating Environment" is provided and describes one example operating environment in which one or more embodiments can be employed. Following this, a section entitled "Tagging in General" is provided and discusses some general principles associated with tagging. Following this, a section entitled "Example Embodiment" describes one or more embodiments in which tags can be created, used and integrated with other applications to provide various services that can enhance a user's experience. A section entitled "Example Methods" follows and describes various methodical aspects in accordance with one or more embodiments.

Last, a section entitled "Example System" is provided and describes an example system that can be utilized to implement the computing device of FIG. 1.

Operating Environment

FIG. 1 illustrates an operating environment in accordance with one or more embodiments, generally at 100. Environment 100 includes a computing device 102 having one or more processors 104, one or more computer-readable media 106 and one or more applications 108 that reside on the computer-readable media and which are executable by the processor(s). The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 8.

In addition, computing device 102 can include software applications such as web browser 110 and instant messaging application 111. In at least some embodiments, various applications are configured to provide functionality based upon strongly typed tags associated with various objects, as will become apparent below.

In addition, environment 100 includes a network 112, such as one or more of the Internet, a presence-based network such as one that is used to implement an instant messaging environment, and one or more web sites 114. Computing device 102 can communicate with web sites 114 and others via network 112 using any suitable protocols. The web sites, as well as other sources, can provide access to various content that can be tagged in accordance with the embodiments described herein.

Computing device 102 can be embodied as any suitable computing device such as, by way of example and not limitation, a desktop computer, a portable computer, a handheld computer such as personal digital assistants (PDA), cell phone, and the like.

Having discussed an example operating environment, consider now a discussion of tagging in general and how strongly typed tags can be created and used.

Tagging in General

One of the principal instruments for creating networks of virtual communities (or online social networks, as they are often called) is "tagging." Tagging refers to a process that allows individuals to apply whatever labels they think best describe content so that they can organize and consume the content. Tagging can be part of an overall social experience of a web site or application, e.g. by being used to organize photos on a photo-posting site, or it can be the primary focus for cataloging information either online or locally.

The tagging process is a user-driven, user-focused process. Specifically, users develop their own tags that describe their ways of conceiving and describing things and their ways of classifying and organizing their world.

Tags can be applied by an individual in any number of ways. For example, a user can apply tags to local objects using an application that executes on their local computing device. A user can also apply tags when a user visits a particular web site. Specifically, the web site may have a user interface component that provides a mechanism by which the individual can apply a tag to content on that site. Additionally, the user's web browser may enable the user to apply tags to URLs or links that they visit.

In accordance with one or more embodiments, individual tags have a property that allows the tag to be associated with a strongly typed variable. A strongly typed variable is one that explicitly represents only one variable type. In accordance with the embodiments described herein, any suitable variable type can be utilized. In the example that follows, a variable type in the form of a people type is utilized. However, it should be appreciated and understood that other types can be utilized without departing from the spirit and scope of the claimed subject matter. For example, in some scenarios, an insurance type variable might be used to represent various insurance entities, a store type variable might be utilized to represent various stores, a vehicle type variable might be used to represent various vehicles, and the like. Further, a region type variable might be used to represent bounded geographic regions and an organization type variable might be used to represent different types of organizations. Needless to say, the example scenarios in which strongly typed tags can be used are seemingly endless.

As but one example, consider FIG. 2. There, a tagged object is shown generally at 200 and includes, in this example, an object 202 and an associated tag 204. Object 202 can comprise any suitable type of object that can be tagged. By way of example and not limitation, object 202 can include digital objects such as photos, videos, blogs, articles, files, web pages, services and the like. Tag 204 includes, in this example, an optional string type property and a people type property.

Here, the optional string type property can be used to provide a so-called "friendly name" for the object. For example, where object 202 is a photo, a character string "Dad" might be used to refer to the fact that Dad appears in the photo.

The people type property is a strongly typed variable that explicitly represents a person or group of people. The people type property can be used to associate a unique identification (ID) with an individual or a group of individuals. Any suitable unique ID can be utilized. For example, in some embodiments, the unique ID can comprise a globally unique ID that is resolvable to a particular person or group of people. Alternately or additionally, the unique ID can comprise an email address, instant messaging ID or any other suitable type of ID. So, in the present example, while the "friendly name" associated with object 202 may be "Dad", the people type property may include Dad's unique ID, such as "bigdaddy_123@xyz.com". In this manner, object 202 now includes a tag that is strongly typed in a manner that is resolvable to Dad by virtue of the unique ID. One example of a unique ID is a Microsoft® Passport User ID or "PUID", as will be appreciated by the skilled artisan.

Consider also that strongly typed tags can also, in at least some embodiments, be used to resolve different strings or "friendly names" to the same unique ID. As an example, consider the following. Assume that Mom has a photo that she wishes to share with her family. As such, she sends the photo to her son Bob and her sister Edna. When Bob receives the photo, he tags it with the friendly name "Mom" and Mom's unique ID. When Edna receives the photo, she tags it with the friendly name "Sis" and the same unique ID that Bob used. In this case, two different strings are resolvable to the same unique ID. That is, if Edna sent Bob similarly tagged photos of Mom that Bob had not yet received, then Bob's system could use the photos' unique ID to resolve that "Sis" should actually read "Mom" for the current user—Bob.

Tag 204 and others like tag 204 can be created in any suitable way. For example, in at least some embodiments, a user interface can be presented to a user to allow the user to create a tag, associate the tag with an object and strongly type the tag by associating with it a unique ID that itself is associated with one or more people. The user interface can be exposed by any suitable application that might be used to tag objects, an example of which is provided below. In addition, the tag can be represented using any suitable type of format examples of which include, by way of example and not limitation, EXchangeable Image File Format (EXIF), EXtensible Metadata Platform (XMP) and the like. For example, one suitable representation for an XMP contact tag could be as follows:

```
<rdf : Description rdf : about = "" xmlns:
MicrosoftPhoto=www.microsoft.com>
   <MicrosoftPhoto:ContactTag>
   <rdf : Description rdf : about = "" xmlns:
   MicrosoftPhoto=www.microsoft.com>
     <MicrosoftPhoto:FriendlyName> Jason </
     MicrosoftPhoto:FriendlyName>
     <MicrosoftPhoto:ID> JasonFlaks@xyz.com </ MicrosoftPhoto:ID>
     </rdf: Description>
   </MicrosoftPhoto: ContactTag>
</rdf:Description>
```

FIG. 3 is a flow diagram that describes steps in a method in accordance with one embodiment. The method can be implemented in connection with any suitable hardware, software, firmware or combination thereof. In at least some embodiments, the method can be implemented in software by, for example, a suitably configured software application examples of which are provided above and below.

Step 300 presents a user interface that enables a user to create a tag. Any suitable user interface can be used, an example of which is provided below. Step 302 defines a tag. This step can be performed by a user via the user interface. For example, using the user interface, a user can define a tag by inputting parameters that are relevant to the tag. Any suitable parameters can be used. For example, in some embodiments, the tag can be defined to have a friendly name, as described above. Step 304 strongly types the tag. This step can be performed by providing a unique ID that is associated with the tag through, for example, a people type property. The unique ID can be associated with an individual person or a group of people. For example, a group of people might include a social circle associated with the user, such as a soccer club or book club. Step 306 associates the tag with an object. Any suitable object can be the subject of this act examples of which are provided above and below.

Having described the nature of tags and how example tags can be structured, consider now an implementation example which illustrates the use of tags in connection with a couple of different applications—a photo viewing/managing application and an instant messaging application. It is to be appreciated and understood that these constitute examples and are not to be used to limit application of the claimed subject matter to only these particular applications. As such, other applications can be utilized without departing from the spirit and scope of the claimed subject matter.

Example Embodiment

Preliminarily, consider the effect of associating a unique ID with a tag or strongly typing the tag. By strongly typing a tag, the tag now contains an actionable piece of information—a uniquely resolvable ID. By virtue of including a uniquely resolvable ID, the tag can serve as a basis for providing a variety of different services. For example, if a user is interacting with an object that includes a strongly typed tag that is resolvable to a person who appears on the user's instant messaging buddy list, if that person is currently online, the user might be prompted from within the application in which they are working to initiate a conversation with their buddy. Alternately or additionally, an application with which the user is working may opt to show, in an appropriately configured user interface, so-called presence information for those people who are the subject of a strongly-typed tag and who are currently online. Examples of both of these scenarios are provided below.

As an example of ways in which strongly typed tags can be utilized, consider the following in connection with FIG. 4.

There, the system from FIG. 1 is shown with like numerals depicting like components. In addition, computing device 102 includes a photo viewing application 400 that enables a user to acquire, view and manage objects in the form of photos and video. In operation, application 400 can allow photos to be acquired from any suitable source such as via an email application that resides on computing device 102, from one or more web sites 114, from one or more other users 402 and/or from computing device 102, and the like.

In this particular example, application 400 includes a user interface component 404 that allows a user to create a tag for a photo that they receive or alternately pull from a local store. User interface 404 includes a field 406 that enables the user to enter a unique ID that is to be associated with a photo 414 via a tag. The unique ID enables a tag to be defined that is strongly typed and associated with photo 414. In this example, the unique ID is an email address that has been entered into field 406. The unique ID could also be a PUID, as noted above. Recall that any suitable unique ID can be utilized. In one or more embodiments, a tag can be created using information from a user's contact information, such as the user's email contacts or instant messenger buddy list. For example, if photo 414 includes a picture from a buddy, then the user may elect to create a tag that is pre-populated with his or her buddy's information. Alternately or additionally, the user may wish to create a new tag with new information if the subject of the photo is not an individual who appears in the user's contact information or instant messaging buddy list.

Further, the user interface includes optional fields 408, 410 to enable a user to enter an event and address, respectively, associated with the photo. An import button 412 is provided to enable the user to import the photo to their local device.

Figure 5:
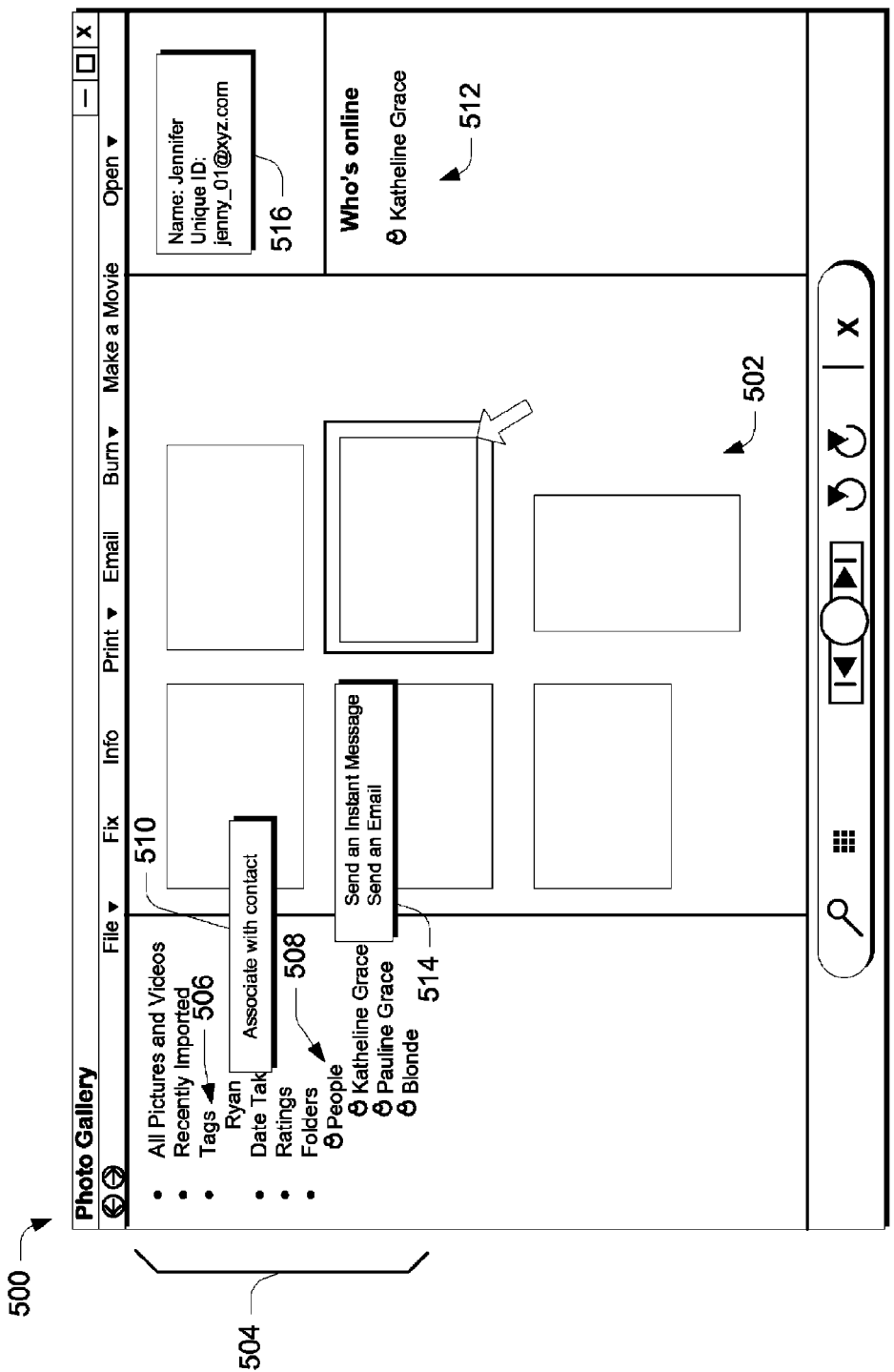
FIG. 5 illustrates an example user interface in accordance with one or more embodiments.

Once the object or photo is tagged in the manner described above, additional services and functionality can be provided using the strongly typed tag as a foundation. As an example, consider FIG. 5 which illustrates a photo gallery user interface generally at 500. The photo gallery user interface can be provided by an application such as photo viewing application 400 (FIG. 4).

The illustrated photo gallery user interface allows a user to view a collection of their photos, such as those shown generally at 502. In addition, the photo gallery user interface includes other features that build upon or otherwise utilize strongly typed tags. Specifically, interface 500 includes a navigation tree 504 having a number of nodes among which are a tag node 506 and a people node 508.

In one or more embodiments, tag node 506 enables a user to create and manage tags from within photo viewing application 400. Specifically, the tag node is expandable to expose a list of tags that the user has created. For example, the user may have created tags for a number of their friends and family. By clicking on the tag node 506, the user can view a list of their created tags. In addition, tag node 506 can enable a user to associate a tag with a contact that might appear in their email contacts or buddy list. That is, the user can be given the opportunity to strongly type a tag. Specifically, in the illustrated example, assume that a tag exists in the tag node for "Ryan". In this example, by right clicking on "Ryan", the user can be given an option to associate Ryan's tag with a contact. Specifically, a flyout menu 510 can give the user an option to associate Ryan's tag with a contact or to otherwise strongly type the tag. If the user elects to associate Ryan's tag with a contact or to strongly type the tag, then the user interface 500 can, in a first instance, present a list of contacts adjacent the fly out menu 510 to enable the user to select an appropriate contact. Once the contact is selected, the user may be presented with a user interface, such as user interface 404 (FIG. 4) to enable the user to enter additional information that is to be associated with Ryan's tag. In a second instance in which the Ryan may not appear in the user's contact list, a user interface such as user interface 404 can be presented to enable the user to strongly type the tag. By doing this, the user has created a strongly typed tag for Ryan. This tag can be used to tag a variety of objects that a user may encounter.

In one or more embodiments, people node 508 is also expandable to expose a list of people who have objects—in this case photos—that have been tagged with strongly typed tags and which are accessible via the photo gallery application. In this particular example, three individuals—Katheline Grace, Pauline Grace and Blondie—have photos that are viewable via user interface 500. By virtue of having photos that have been tagged with strongly-typed tags, the photo viewing application can show so-called presence information to indicate that a particular person is online. Specifically, by virtue of knowing the unique ID for individual tag-bearing photos, the photo viewing application (or another application or component acting on its behalf) can contact an appropriate presence network, provide the unique IDs to the network and receive back a notification of whether any corresponding individuals are currently online. If so, the photo viewing application can cause an icon to be presented which indicates the individuals who are currently online. For example, a user interface portion 512 can show an icon to indicate who among the people in the "People" folder are online. In one or more embodiments, by right clicking on a particular person in the "People" folder, a flyout menu 514 can be presented to give the user a choice to send an individual an email and/or start an instant messaging conversation with the particular person.

The same or similar functionality can be provided when a user browses to and selects a particular photo. Specifically, when the user selects a photo having a strongly-typed tag (as indicated by the cursor arrow in the figure), the user can be presented with an option to email or start an instant messaging conversation with a person associated with the photo (assuming that the person is online). Further, in one or more embodiments, when the user selects a particular photo, the tags that are associated with that photo can be shown, as at 516. In one or more embodiments, security can be enhanced by showing tags only for those individuals who appear in a person's contact or buddy list.

Example Methods

FIG. 6 is a flow diagram that describes steps in a method in accordance with one or more embodiments. The illustrated method describes one way in which instant messaging and/or email functionality can be integrated in an application using strongly typed tags. The method can be implemented in connection with any suitable hardware, software, firmware or combination thereof. In at least some embodiments, the method can be implemented in software as by a suitably configured software application.

Step 600 starts or provides an application that is not primarily an instant messaging application or email application. Any suitable application can be used. An application that is not primarily an instant messaging application or an email application can be considered as one that includes functionality that is the primary focus of the application, which functionality is not instant messaging functionality or email functionality. Put another way, such an application would be one that would not be the primary source for instant messaging or email functionality. However, instant messaging and/or email functionality can be accessed through or by such an application, as will become apparent below. A photo viewing application, for example, can be considered as one that is not primarily an instant messaging application or email application. Other applications can include, by way of example and not limitation, music playing applications, word processing applications, software de-bugging applications and the like.

Step 602 provides, through the application, one or more objects having strongly typed tags. Any suitable type of object can be used, examples of which are provided above. Step 604 receives a user selection via the application. Any suitable user selection can be received. For example, a user selection can include, by way of example and not limitation, selecting a particular object that has an associated tag. Alternately or additionally, a user selection can include selecting a particular user interface element, such as an element in a navigation tree such as that described above in FIG. 5.

Step 606 uses one or more strongly typed tags, responsive to the user's selection, to provide the user with an option to initiate an instant messaging session and/or send a person or entity associated with the one or more tags an email message. Examples of how this can be done are provided above. It is to be appreciated and understood that other types of functionality can be provided using strongly typed tags as a basis. For example, software executing on a user's computing device can resolve discrepancies using strongly-typed tags. One example of this is resolving different friendly names to the same unique ID associated with a strongly-typed tag. In addition, software executing on a user's computing device can automatically assign strongly-typed tags to various objects that a user might receive. Further, the user's system might be able to group, sort, prioritize or otherwise contextualize information in aggregate by leveraging known groupings and hierarchies in a user's address book, and/or by using that extended information to provide a customized experience for the user.

FIG. 7 is a flow diagram that describes steps in a method in accordance with one or more embodiments. The illustrated method describes another way in which instant messaging functionality can be integrated in an application using strongly typed tags. The method can be implemented in connection with any suitable hardware, software, firmware or combination thereof. In at least some embodiments, the method can be implemented in software as by a suitably configured software application.

Step 700 starts or provides an application that is not primarily an instant messaging application or email application.

Step 702 provides, through the application, one or more objects having strongly typed tags. Any suitable type of object can be used, examples of which are provided above. Step 704 uses the objects and their associated strongly typed tags to display presence information in an application user interface. This step can be performed in any suitable way. For example, when a user is working with an application that includes objects with strongly typed tags, the application (or another application or component acting on its behalf) can use the unique IDs associated with each tag to contact a presence network. Presence networks typically include databases that maintain presence information that describes individuals who are currently online or offline. Such networks are used to implement instant messaging functionality, as will be appreciated by the skilled artisan. Once the presence information is ascertained by the application, such information can be displayed by the application. For example, if the user's application includes a number of objects such as photos, and two of the individuals associated with strongly-typed photo tags are currently online, an appropriate icon, such as the one shown in FIG. 5, can be displayed by the application. Appropriate icons can be displayed to indicate that other individuals are not online. In this way, a user can opt to initiate an instant messaging conversation with any of their contacts who happen to be online.

Consider, for example, the user who just received a vacation photo collection from a friend who returned from vacation. When the user opens the photos and starts browsing the photos, they notice an icon in the user interface that indicates that their friend is online. The user then takes the opportunity to send a quick instant message to their friend—"Hey Frank—I got your photos and they look great!"

In this way, the user's experience can be enhanced from within the application in which they are currently working.

Example System

FIG. 8 illustrates an example computing device 800 that can implement the various embodiments described above. Computing device 800 can be, for example, computing device 102 of FIG. 1 or any other suitable computing device.

Computing device 800 includes one or more processors or processing units 802, one or more memory and/or storage components 804, one or more input/output (I/O) devices 806, and a bus 808 that allows the various components and devices to communicate with one another. Bus 808 represents one or more of any of several types of bus structures, including a memory bus or memory controller, a peripheral bus, an accelerated graphics port, and a processor or local bus using any of a variety of bus architectures. Bus 808 can include wired and/or wireless buses.

Memory/storage component 804 represents one or more computer storage media. Component 804 can include volatile media (such as random access memory (RAM)) and/or non-volatile media (such as read only memory (ROM), Flash memory, optical disks, magnetic disks, and so forth). Component 804 can include fixed media (e.g., RAM, ROM, a fixed hard drive, etc.) as well as removable media (e.g., a Flash memory drive, a removable hard drive, an optical disk, and so forth).

One or more input/output devices 806 allow a user to enter commands and information to computing device 800, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

In one or more embodiments, a tag is provided and includes a property that associates a strongly typed variable with the tag. Strongly typed variables can include any suitable types. For example, in at least some embodiments, the strongly typed variable is a people type that allows the tag to be associated with an individual person or group of people by virtue of a unique identification that is associated with the person or group. Strongly typed tags can then serve as a foundation upon which various other types of information and services can be provided to enhance the user experience.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer-readable storage media devices having computer-readable instructions thereon which, when executed, implement a method comprising:

presenting a user interface that enables a user to create a tag that is to be used to tag one or more digital objects;

defining the tag using the user interface;

strongly typing the tag by providing a unique ID that is associated with an individual or group of people, wherein the tag is configured to associate a changeable property with the unique ID, the changeable property being a name, wherein different names associated with a same unique ID are automatically resolved to the same unique ID independent of a user resolving the different names;

using the tag to present multiple user-selectable communication options to the user that the user can select, via a cursor, to cause initiation of a communication with a tagged entity, responsive to the user interacting with the one or more digital objects; and presenting the tag in a navigation tree that is displayed on the user interface and which includes a tag node that is expandable to expose a list of previously created tags.

2. The one or more computer-readable storage media devices of claim 1, wherein the instructions, when executed, implement a method further comprising associating the tag with the one or more digital objects.

3. The one or more computer-readable storage media devices of claim 1, wherein the user interface comprises one that is presented via a photo viewing application.

4. The one or more computer-readable storage media devices of claim 1, wherein the instructions, when executed, implement a method further comprising using the tag to provide one or more services to the user.

5. The one or more computer-readable storage media devices of claim 1, wherein one of the user-selectable communication options comprises an instant messaging service.

6. The one or more computer-readable storage media devices of claim 1, wherein one of the user-selectable communication options comprises an email service.

7. The one or more computer-readable storage media devices of claim 1, wherein the unique ID comprises an email address.

8. The one or more computer-readable storage media devices of claim 1, wherein the unique ID comprises an instant messaging ID.

9. A system comprising:

a digital object embodied on a computer-readable storage medium;

a tag associated with the digital object and embodied on the computer-readable storage medium, wherein the tag includes a property that associates a strongly typed variable with the tag, wherein the tag is configured to associate a changeable property with the strongly typed variable, the strongly typed variable including a unique ID, the changeable property being a name, and wherein different names associated with a same unique ID are automatically resolved to the same unique ID independent of a user resolving the different names; and code embodied on the computer-readable storage medium configured to present the tag in a navigation tree that comprises a tag node expandable to expose a list of previously created tags, the code further configured to use the tag to present multiple user-selectable communication options to the user that the user can select, via a cursor, to cause initiation of a communication with a tagged entity, responsive to the user interacting with the digital object.

10. The system of claim 9, wherein the strongly typed variable comprises a people type variable that associates the tag with a person or group of people, wherein the tag is configured to be used to provide at least one or more of email functionality or instant messaging functionality, and wherein the object is a photo.

11. The system of claim 9, wherein the changeable property includes a string type property that can be used to provide a friendly name for the object.

12. The system of claim 9, wherein the strongly typed variable comprises a people type variable that associates the tag with a person or group of people, wherein the tag is configured to be used to provide at least one or more of email functionality or instant messaging functionality, and wherein the people type variable associates the tag with the person or group of people by associating the unique ID with the tag.

13. The system of claim 12, wherein the unique ID comprises an instant messaging ID.

14. The system of claim 12, wherein the unique ID comprises an email address.

15. A computer-implemented method, comprising:
   providing one or more objects through an application that is not primarily an instant messaging application or email application;
   the one or more objects having at least one strongly typed tag and at least one changeable property, the at least one changeable property being a name, wherein different names associated with a same unique ID are automatically resolved to the same unique ID independent of a user resolving the different names, wherein strongly typed tags uniquely associate tags with an individual or group of people;
   presenting a navigation tree comprising a tag node that is expandable to expose a list of previously created tags which are usable to tag the one or more objects: and
   using one or more strongly tags from within the application to present a user interface element that gives the user a choice to select between functionalities including an instant messaging functionality or an email functionality.

16. The computer-implemented method as recited in claim 15, wherein using the one or more strongly typed tags further comprises displaying instant messaging presence information in a user interface of the application.

17. The computer-implemented method as recited in claim 15, wherein providing the one or more objects further comprises providing one or more photos.

* * * * *